(12) United States Patent
Cai et al.

(10) Patent No.: US 12,712,176 B2
(45) Date of Patent: Aug. 18, 2026

(54) ELECTRODE CALENDERING WITH ROLLERS HAVING CONTROLLABLE SLEEVES

(71) Applicant: GM GLOBAL TECHNOLOGY OPERATIONS LLC, Detroit, MI (US)

(72) Inventors: Wayne Cai, Troy, MI (US); Raghavendra Keerthi Manda, Northville, MI (US); Donghao Liu, Troy, MI (US); Melissa K. Standing-Ball, New Boston, MI (US); Changbai Tan, Ann Arbor, MI (US); Nilesh D. Mankame, Ann Arbor, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 18/598,194

(22) Filed: Mar. 7, 2024

(65) Prior Publication Data

US 2025/0286038 A1 Sep. 11, 2025

(51) Int. Cl.
*H01M 4/04* (2006.01)
*B29C 43/24* (2006.01)
(Continued)

(52) U.S. Cl.
CPC .......... *H01M 4/0435* (2013.01); *B29C 43/24* (2013.01); *B29C 43/245* (2013.01); *B29C 43/46* (2013.01);
(Continued)

(58) Field of Classification Search
CPC ..... H01M 4/043; H01M 4/0435; B29C 43/46; B29C 2043/466; B29C 43/56;
(Continued)

(56) References Cited

U.S. PATENT DOCUMENTS

2012/0045689 A1* 2/2012 Okabe ................. H01M 4/0435 427/58
2016/0023406 A1* 1/2016 Shome ................ B32B 37/0046 156/221

(Continued)

FOREIGN PATENT DOCUMENTS

CN 208352428 U 1/2019
CN 217617210 U 10/2022

(Continued)

OTHER PUBLICATIONS

German Office Action from counterpart DE1020241125721, dated Jan. 14, 2025.

(Continued)

*Primary Examiner* — Jeffrey M Wollschlager

(57) ABSTRACT

An electrode calendering system for reducing post-calendering electrode wrinkling includes at least one roller configured to compress an electrode and a sleeve. The roller is defined by an outer surface configured to contact the electrode. The outer surface has a first edge portion at a first side of the roller and a second edge portion at a second side of the roller opposing the first side. The first edge portion and the second edge portion of the roller align with first and second outer edges of the electrode when the electrode contacts the roller. The sleeve is disposed about the outer surface of the roller along the first edge portion, the sleeve having a controllable thickness to adjust a pressure between the first outer edge of the electrode and the sleeve. Other example systems and methods for reducing post-calendering electrode wrinkling are also disclosed.

20 Claims, 10 Drawing Sheets

(51) Int. Cl.
*B29C 43/46* (2006.01)
*B29C 43/58* (2006.01)
*B29L 31/34* (2006.01)

(52) U.S. Cl.
CPC ...... *B29C 43/58* (2013.01); *B29C 2043/5808* (2013.01); *B29C 2043/5816* (2013.01); *B29L 2031/3468* (2013.01)

(58) Field of Classification Search
CPC ................ B29C 43/58; B29C 2043/58; B29C 2043/5825; B29C 33/48; B29C 33/485; B29C 33/50; B29C 33/505; B92C 33/46
See application file for complete search history.

(56) References Cited

U.S. PATENT DOCUMENTS

| | | | | |
|---|---|---|---|---|
| 2017/0113395 | A1* | 4/2017 | Kakinoki | B29C 48/90 |
| 2017/0120483 | A1* | 5/2017 | Shinobudani | B29C 43/24 |
| 2019/0165422 | A1* | 5/2019 | Kim | H01M 4/0435 |
| 2020/0185698 | A1* | 6/2020 | Kim | H01M 4/13 |
| 2021/0288302 | A1* | 9/2021 | Jamadar | H01M 4/0404 |
| 2023/0139916 | A1* | 5/2023 | Madden | G01L 5/0028 73/862.626 |
| 2023/0335704 | A1* | 10/2023 | Deng | H01M 4/0404 |
| 2023/0398758 | A1* | 12/2023 | Lee | B30B 15/24 |
| 2024/0207915 | A1* | 6/2024 | Liu | B21D 37/04 |
| 2024/0413296 | A1* | 12/2024 | Hackfort | H01M 4/0435 |
| 2025/0038165 | A1* | 1/2025 | Kim | H01M 4/04 |

FOREIGN PATENT DOCUMENTS

| | | | | |
|---|---|---|---|---|
| CN | 220984559 | U | | 5/2024 |
| CN | 114798813 | B | | 10/2024 |
| DE | 102023129831 | A1 | | 10/2024 |
| WO | WO2023078487 | | * | 3/2023 |
| WO | WO2023085796 | | * | 5/2023 |

OTHER PUBLICATIONS

U.S. Appl. No. 18/469,720, filed Sep. 19, 2023, Ellison et al.
U.S. Appl. No. 18/469,759, filed Sep. 19, 2023, Ryan et al.

* cited by examiner 900
904
902
910
904
902
904
902

ELECTRODE CALENDERING WITH ROLLERS HAVING CONTROLLABLE SLEEVES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrode calendering with rollers having controllable sleeves, and more particularly to electrode calendering with rollers having sleeves with thicknesses that are actively and/or passively adjusted to reduce wrinkling of electrodes.

Electric power sources, such as batteries for vehicles include anode and cathode electrodes. An anode electrode may include lithium. In such examples, a lithium metal anode can be formed by applying a layer of lithium material to a layer of copper material to form a stack and then cold rolling (or calendering) the stack between a pair of rollers.

SUMMARY

An electrode calendering system for reducing post-calendering electrode wrinkling includes at least one roller configured to compress an electrode and a sleeve. The roller is defined by an outer surface configured to contact the electrode. The outer surface has a first edge portion at a first side of the roller and a second edge portion at a second side of the roller opposing the first side. The first edge portion and the second edge portion of the roller align with first and second outer edges of the electrode when the electrode contacts the roller. The sleeve is disposed about the outer surface of the roller along the first edge portion, the sleeve having a controllable thickness to adjust a pressure between the first outer edge of the electrode and the sleeve.

In other features, the sleeve is a first sleeve, the electrode calendering system further includes a second sleeve disposed on the outer surface of the roller along the second edge portion, and the second sleeve has a controllable thickness to adjust a pressure between the second outer edge of the electrode and the second sleeve.

In other features, the thickness of the sleeve adjusts passively to modulate the pressure between the first outer edge of the electrode and the sleeve.

In other features, the sleeve includes a plurality of knitted courses each having loops interlocking with loops of an adjacent knitted band of the plurality of knitted bands.

In other features, one or more of the knitted courses includes an inlay element woven therein.

In other features, the sleeve includes multiple inlaid elements having a sinusoidal shape in a circumferential direction relative to the roller.

In other features, the plurality of knitted courses includes a first set of courses formed of a smart material and a second set of courses formed of non-smart materials, and the first set of courses and the second set of courses are collocated or alternated in occurrence within the sleeve.

In other features, the sleeve includes a smart material element.

In other features, the smart material element includes a super-elastic shape memory alloy.

In other features, the sleeve includes a support layer and the smart material element integrated into the support layer.

In other features, the support layer is a first support layer, and the sleeve includes a second support layer disposed along a surface of the first support layer such that a portion of the layer of the smart material is positioned between the first support layer and the second support layer.

In other features, the electrode calendering system further includes at least one optical sensor disposed downstream of the roller, the control module in communication with the optical sensor, and the control module is configured to receive a signal from the optical sensor and control the temperature control device based on the signal from the optical sensor to adjust a temperature of the sleeve, thereby adjusting the pressure between the first outer edge of the electrode and the sleeve.

In other features, the thickness of the sleeve is actively controlled to adjust the pressure between the first outer edge of the electrode and the sleeve.

In other features, the electrode calendering system further includes a force or pressure sensor disposed between the sleeve and the roller, a temperature control device adjacent to the sleeve, and a control module in communication with the force or pressure sensor and the temperature control device, the control module configured to receive a signal from the force or pressure sensor and control the temperature control device based on the signal to adjust a temperature of the sleeve, thereby adjusting the pressure between the first outer edge of the electrode and the sleeve.

An electrode calendering method for reducing post-calendering electrode wrinkling, includes receiving an electrode at a roller. The roller is defined by an outer surface configured to contact the electrode. The outer surface has a first edge portion at a first side of the roller and a second edge portion at a second side of the roller opposing the first side. The first edge portion and the second edge portion of the roller align with first and second outer edges of the electrode when the electrode contacts the roller. The electrode calendering method further includes controlling a thickness of a sleeve disposed about the outer surface of the roller along the first edge portion, to adjust a pressure between the first outer edge of the electrode and the sleeve.

In other features, controlling the thickness of the sleeve includes passively adjusting the thickness of the sleeve to modulate the pressure between the first outer edge of the electrode and the sleeve.

In other features, controlling the thickness of the sleeve includes actively controlling thickness of the sleeve to adjust the pressure between the first outer edge of the electrode and the sleeve.

In other features, the sleeve includes a plurality of knitted courses each having loops interlocking with loops of an adjacent knitted course of the plurality of knitted courses, and one or more of the knitted courses includes an inlay woven therein.

In other features, the sleeve includes a smart material.

In other features, the electrode calendering method further includes receiving a signal from a force or pressure sensor disposed between the sleeve and the roller, and controlling a temperature control device based on the signal to adjust a temperature of the sleeve.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

During production of battery electrodes, defects can occur and/or exist in the electrode material, such as surface, internal and interface type defects. For example, significant wrinkling of battery cell electrodes may occur during an electrode calendering process. More specifically, battery cell electrodes are generally formed of foil having an interior coated region and uncoated bare edges on opposing sides of the interior coated region. In the calendering process, there is often a need for very high compressive force between rollers to produce higher electrode density. The compressive force is often applied on the interior coated region only. In some examples, this applied force configuration on the foil causes wrinkling and other failures of the uncoated foil (at the two edges).

The electrode calendering systems and methods according to the present disclosure provide solutions to reduce post-calendering electrode wrinkling by controlling the contact pressure between the uncoated edges of the electrode and calendering roller(s). In various embodiments, and as further explained below, the solutions include disposing sleeves about the outer curved surfaces of calendering rollers, along outer edge portions of the rollers. Each sleeve is passively and/or actively altered (e.g., without or with in-process sensing and feedback signals) to control or adjust a thickness of the sleeve and to adjust or modulate a contact pressure between the outer edge of the electrode and the sleeve. In various embodiments, the thickness of the sleeve may be adjusted by a few microns or up to about 30 microns if desired.

Figure 1:
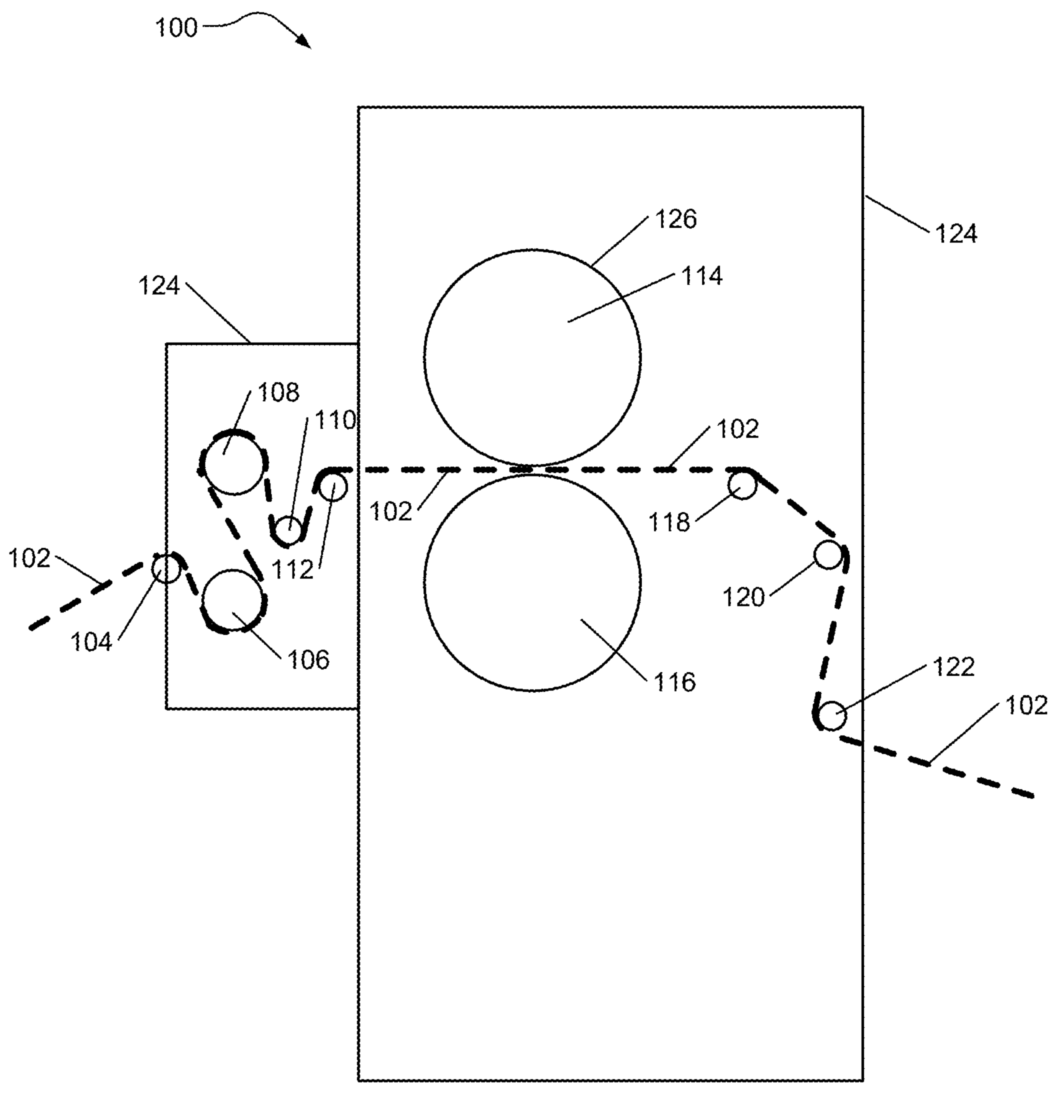
FIG. 1 is a diagram of an electrode calendering system for reducing post-calendering electrode wrinkling, according to the present disclosure.

Referring now to FIG. 1, a block diagram of an example electrode calendering system 100 is presented for reducing post-calendering electrode wrinkling. The electrode calendering system 100 of FIG. 1 and/or any of the other example systems and methods herein may be applicable in the manufacturing of battery cell electrodes (e.g., anode and cathode electrodes) for vehicle applications and/or any other suitable applications including electrodes.

As shown in FIG. 1, the electrode calendering system 100 generally includes multiple rollers 104, 106, 108, 110, 112, 114, 116, 118, 120, 122 and an electrode 102 (shown as a dashed line). In the example of FIG. 1, the rollers have various sizes for compressing and moving the electrode 102 through a cabinet 124 housing the rollers. The rollers may include idle rollers having fixed locations and dance rollers which may be adjusted (e.g., up and down in a vertical direction).

Figures 2, 3:
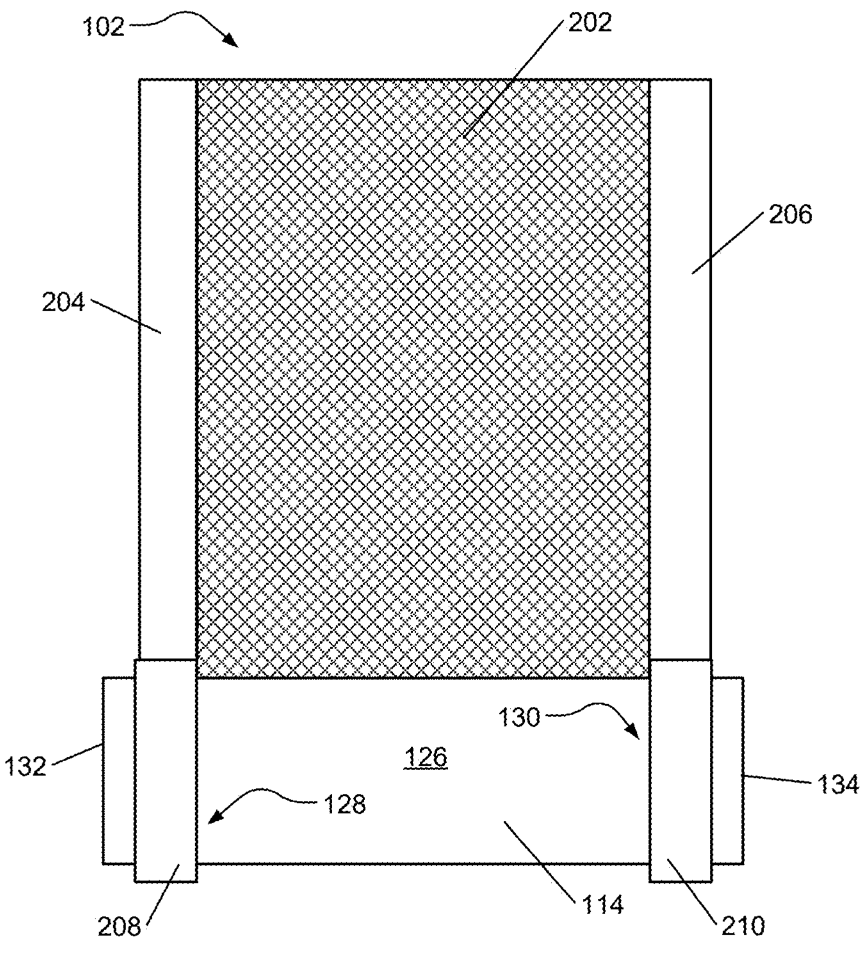
FIG. 2 is a diagram of an electrode and a roller of the electrode calendering system of FIG. 1, with sleeves wrapped around the roller according to the present disclosure.
FIG. 3 is a side view of the roller and one of the sleeves of FIG. 2, according to the present disclosure.

In the example of FIG. 1, the electrode 102 may be conventional. For example, the electrode 102 may be formed of foil or another suitable electrically conductive material. Additionally, the electrode 102 may have multiple regions. For instance, FIG. 2 depicts one example of the roller 114 and the electrode 102 of FIG. 1. As shown in FIG. 2, the electrode 102 generally includes an interior region (e.g., a coated region) 202 and outer edges (e.g., uncoated, bare edges) 204, 206 on opposing sides of the interior region 202. In some examples, the outer edges 204, 206 may have the same width (e.g., as shown in FIG. 2) or different widths depending, for example, on the design of the electrode 102. In such examples, both outer edges 204, 206 may be uncoated, bare edges. In other examples, only one of the outer edges 204, 206 may be an uncoated, bare edge while the other outer edge 204, 206 may be coated (e.g., similar to the interior region 202).

Each roller 104, 106, 108, 110, 112, 114, 116, 118, 120, 122 of FIG. 1 is cylindrically shaped and defined by an outer surface for contacting (and sometimes compressing) the electrode 102. For example, FIG. 3 depicts one example of the roller 114 of FIGS. 1-2. As shown in FIGS. 1-3, the roller 114 includes an outer surface 126 that contacts the electrode 102 when the electrode 102 is passed by the roller 114. In this example, the outer surface 126 has edge portions 128, 130 at opposing sides (or ends) 132, 134 of the roller 114. As shown, the edge portions 128, 130 of the roller 114 substantially align with the outer edges 204, 206 of the electrode 102 when the electrode contacts the roller 104.

In various embodiments, one or more sleeves may be disposed about the outer surface of any one of the rollers

104, 106, 108, 110, 112, 114, 116, 118, 120, 122 of FIG. 1. In such examples, the sleeve(s) may be disposed around the roller outer surface in a circumferential direction. For example, and as shown in FIGS. 2-3, two sleeves 208, 210 are disposed about the outer surface 126 of the roller 114 along the edge portions 128, 130 of the roller 114. In such examples, the sleeves 208, 210 are aligned with the outer edges 204, 206 of the electrode 102 when the electrode contacts the roller 104, as shown in FIG. 2. While the example of FIGS. 2-3 is described with the roller 114 having two sleeves 208, 210 wrapped around its outer surface 126, it should be appreciated that the roller 114 may include more or less sleeves desired depending on, for example, possible wrinkle location(s) of an electrode. Additionally, in various embodiments, other rollers may include one or more sleeves as disclosed herein. For example, the roller 116 of FIG. 1 may have one or more sleeves corresponding to the one or more sleeves on the roller 114.

The sleeves 208, 210 of FIGS. 2-3 may include various characteristics. For example, and as further explained herein, the sleeves 208, 210 may include different types of material, different shapes, etc. to reduce post-calendering wrinkling of an electrode (e.g., the electrode 102). This reduction in wrinkling is generally achieved by controlling the thicknesses of the sleeves 208, 210 to adjust contact pressures between the outer edges 204, 206 of the electrode 102 and the sleeves 208, 210. For example, the stiffness of each sleeve 208, 210 may be adjusted (e.g., sometimes in real-time) to control the thickness of that sleeve 208, 210 when the sleeve contacts the corresponding outer edge 204, 206 of the electrode 102. By adjusting the stiffness and therefore thickness of the sleeves 208, 210, the contact pressure between the electrode 102 and the sleeves 208, 210 wrapped around the roller 114 may be controlled to ensure a desired force is applied to the outer edges 204, 206 of the electrode 102. In doing so, non-uniformities of the electrode 102 and/or the roller 114 (e.g., roller gaps, electrode coating variations, etc.) may be negated while a compressive force is applied to the outer edges 204, 206, thereby reducing (and sometimes eliminating) wrinkling defects along the outer edges 204, 206 of the electrode 102.

In various embodiments, the thickness of each sleeve 208, 210 may be passively or actively adjusted. For example, the stiffness of each sleeve 208, 210 may be passively modulated without in-process sensing and feedback signals. In such examples, the sleeves 208, 210 may include desirable components (e.g., materials, components, etc.), have desirable shapes, be formed in desirable manners, etc. to cause the thickness of the sleeves 208, 210 to change, as further explained below. In other examples, the stiffness of each sleeve 208, 210 may be actively modulated with in-process sensing and feedback signals to cause the thickness of the sleeves 208, 210 to change, as further explained below.

Figure 4:
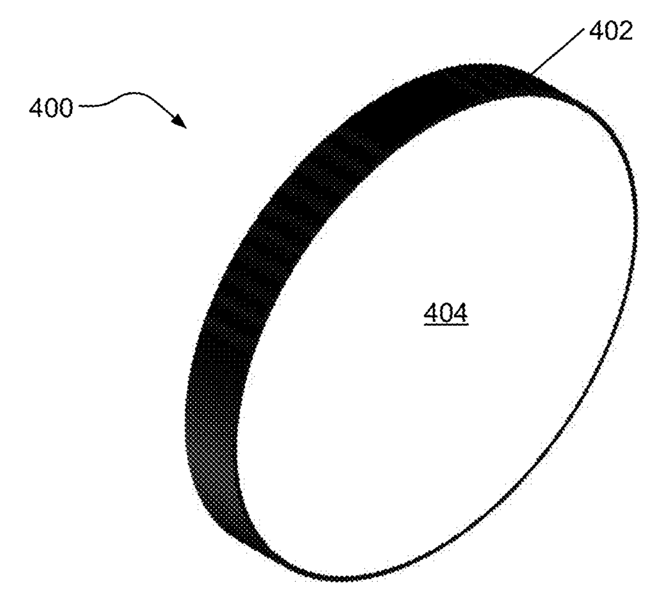
FIG. 4 is an isometric view of an example sleeve including a smart material, according to the present disclosure.

For example, the sleeves herein may be formed at least partially of smart materials. In such examples, the sleeves may include a matrix of non-active material and a smart material. This configuration of materials exhibits a stretchy characteristic, thereby allowing the sleeves to be stretched to slip on and off the roller. As one example, FIG. 4 depicts a sleeve 400 that may be employed as any one of the sleeves 208, 210 shown in FIGS. 2-3. In the example of FIG. 4, the sleeve 400 includes a base 402 defining an opening 404. With this configuration, the base 402 (and more generally, the sleeve 400) may be positioned about a roller (e.g., the roller 114 of FIGS. 1-3) such that the sleeve 400 contacts the outer surface of the roller and the roller extends through the opening 404.

In the example of FIG. 4, the sleeve 400 includes at least one smart (or active) material to adaptively adjust the thickness/stiffness of the sleeve 400 and/or the contact pressure between the electrode and sleeve 400 without in-process sensing signals. For example, in one embodiment, the sleeve 400 may take the form of a woven belt including one or more yarns made of non-active/smart material (e.g., polyester, etc.) and an active/smart element made of a super-elastic shape memory alloy (SE-SMA). In such examples, the non-active yarns constitute a matrix that contains and locates the SE-SMA elements in the proper position within the belt. The matrix is stretchy (e.g., may undergo large elastically recoverable strains) due to, for example, the architecture of the weave, the properties of the non-active yarns, or both. The SE-SMA material exhibits large recoverable strain due to, for example, of a reversible, stress-driven solid-state phase transformation in the SE-SMA material. Additionally, the geometry of the SE-SMA element may also allow it to undergo recoverable deformations. As both components of the sleeve 400 (e.g., the matrix and the SE-SMA element) exhibit large recoverable strains, the sleeve 400 itself can undergo large (e.g., 2-10%) strain, which makes it possible for the sleeve 400 to be stretched to assemble it onto the roller or disassemble it from the roller.

In such examples, the shape memory alloy (SMA) may be a metal material with unique properties that allow the material to be trained to move (e.g., stretched, bent, etc.) and revert to its original shape. As an example, the SMA component may be based on a nickel-titanium alloy (e.g., nitinol, etc.). In other examples, the SMA component may be a copper-based alloy, a gold-based alloy, etc.

Figure 5:
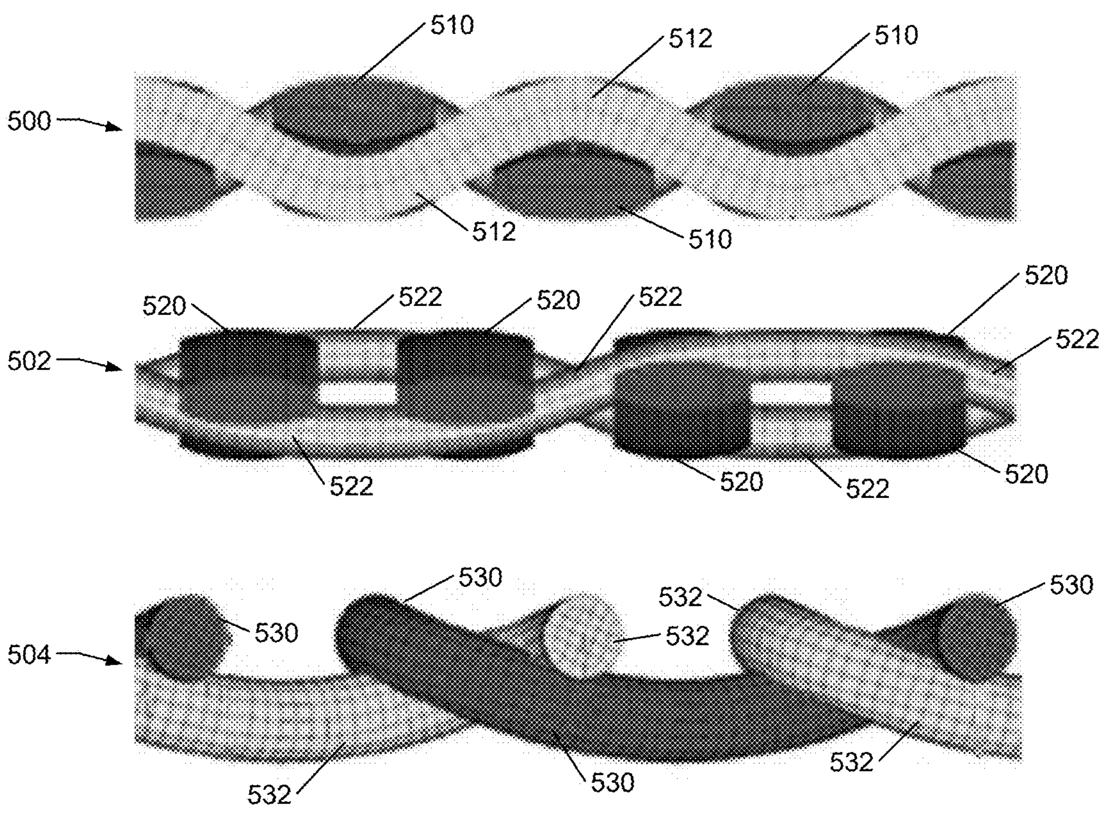
FIGS. 5-7 are examples of portions of the sleeve of FIG. 4, according to the present disclosure.
Figure 6:
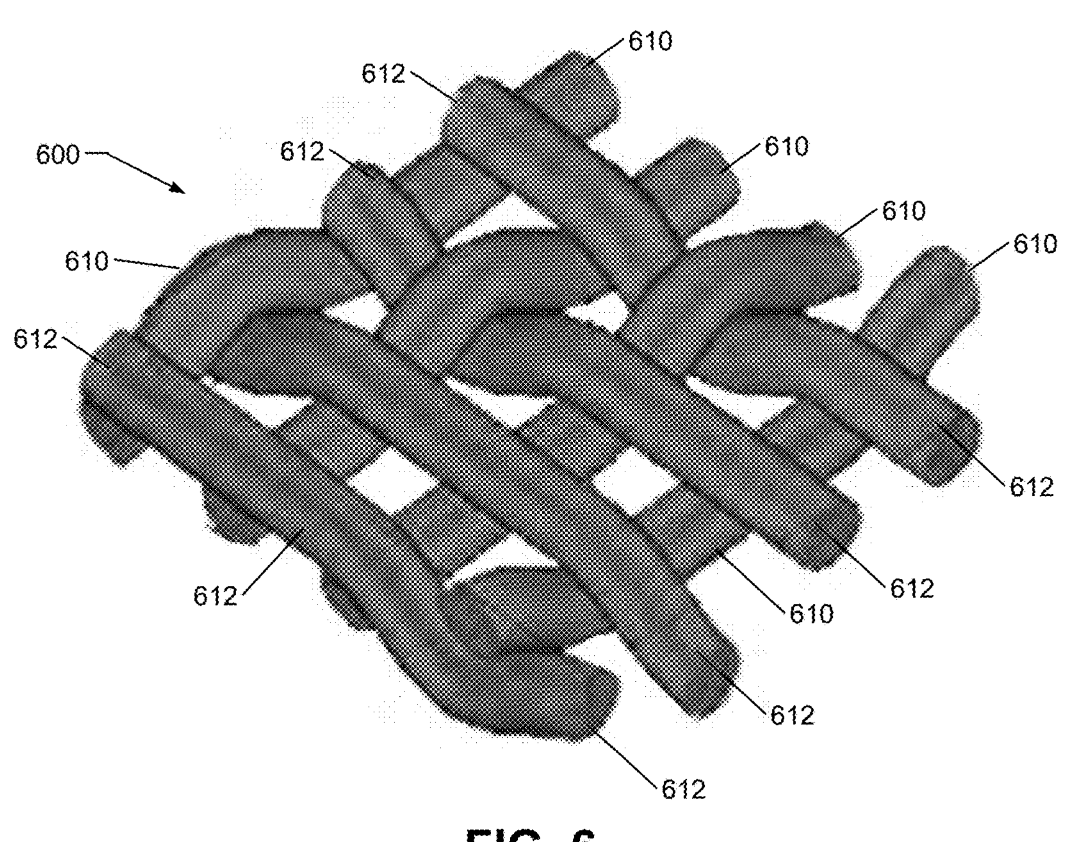
Figure 7:
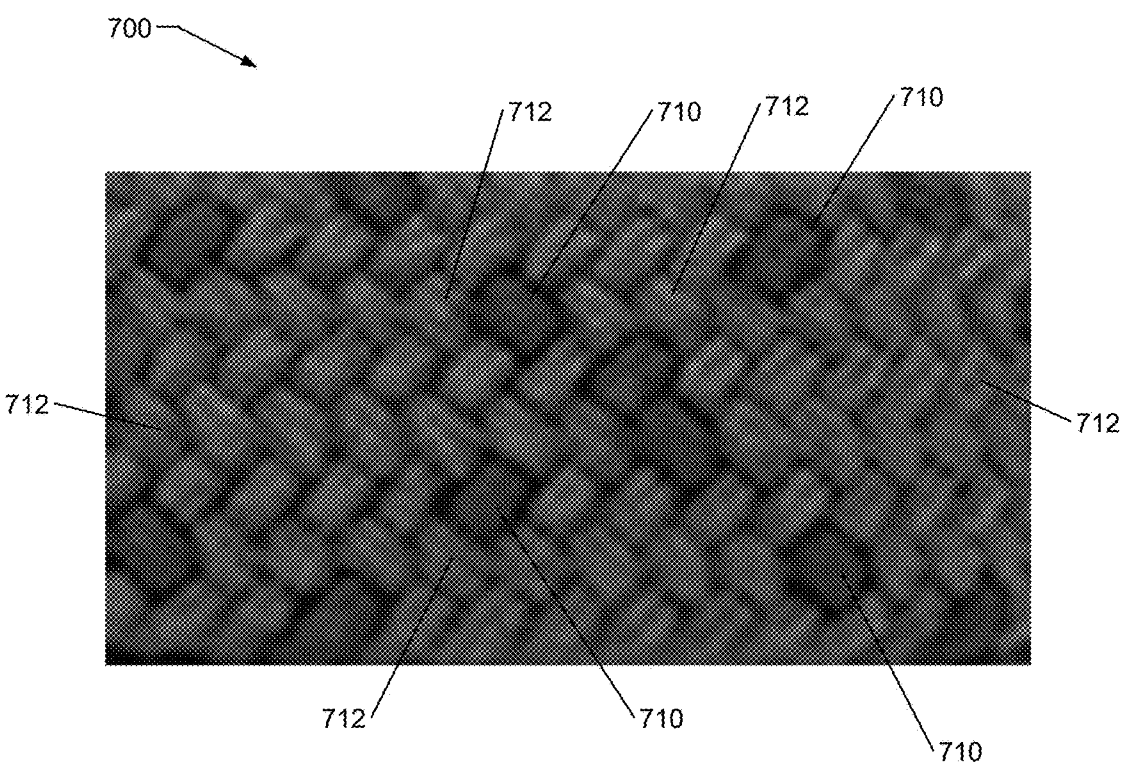

FIGS. 5-7 depict various sleeve portions 500, 502, 504, 600, 700 that may form a part of the sleeve 400 of FIG. 4. For example, in FIG. 5, the sleeve portion 500 includes a strand of yarn 512 (e.g., non-active/smart material such as, polyester, etc.) and an active/smart element 510 (e.g., formed of SE-SMA), the sleeve portion 502 includes two strands of yarn 522 and multiple active/smart elements 520, and the sleeve portion 504 includes strands of yarn 532 and strands of an active/smart element 530. Additionally, as shown in FIG. 6, the sleeve portion 604 includes strands of yarn 612 and strands of an active/smart element 610. In FIG. 7, the sleeve portion 704 includes strands of yarn 712 and strands of an active/smart element 710.

Figures 8, 9:
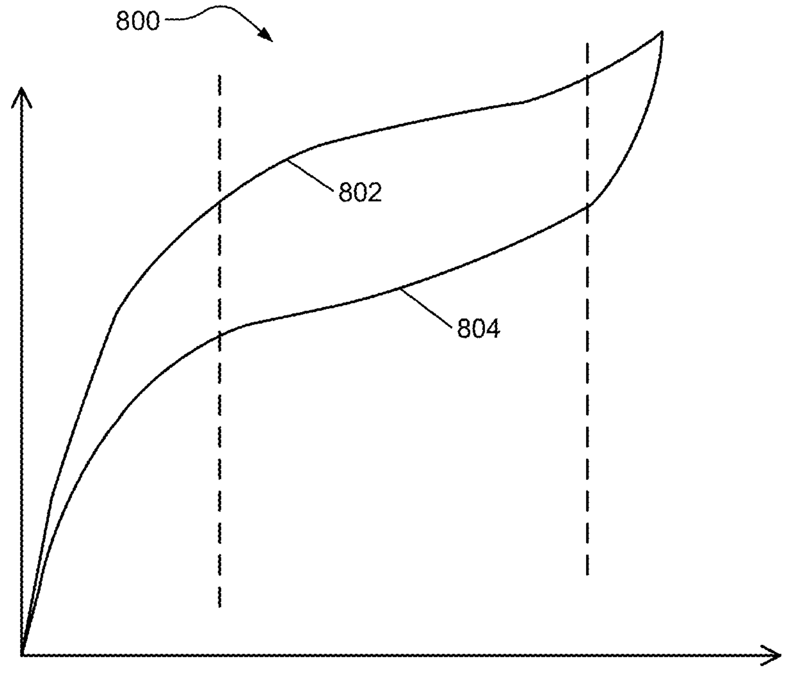
FIG. 8 is a graph plotting a stress-strain response of a smart material, according to the present disclosure.
FIG. 9 is a side view of a portion of an example sleeve having a single layer design with an integrated smart material, according to the present disclosure.

In various embodiments, SE-SMA materials generally exhibit a plateau in their stress-strain responses. For example, FIG. 8 depicts a graph 800 plotting a stress-strain response of a SE-SMA material relative to the stress (y-axis) and the strain (x-axis). The graph 800 includes a line 802 representing the forward transformation (e.g., loading) of the SE-SMA material and a line 804 representing the reverse transformation (e.g., unloading) of the SE-SMA material. As shown, the SE-SMA material generally exhibits a plateau between the dashed vertical lines. In this region, the forward transformation line 802 and the reverse transformation line 804 have smaller positive slopes as compared to other regions along the lines 804, 804. With this approach, the material response can be utilized to create passive SE-SMA elements that exert a nearly constant-force (stress) over a strain range of about 2%-8%. As such, this design ensures constant pressure of the sleeve 400 on the calendering roller (e.g., the roller 114) that can easily accommodate roller gaps and/or electrode coating variations of up to 15 microns or more, which is more than enough for production purposes that generally have variations of 10 microns or less.

Figure 10:
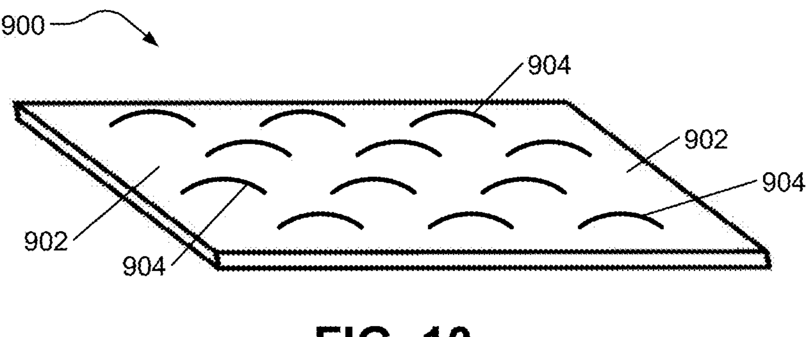
FIG. 10 is an isometric view of the sleeve of FIG. 9, according to the present disclosure.
Figure 11:
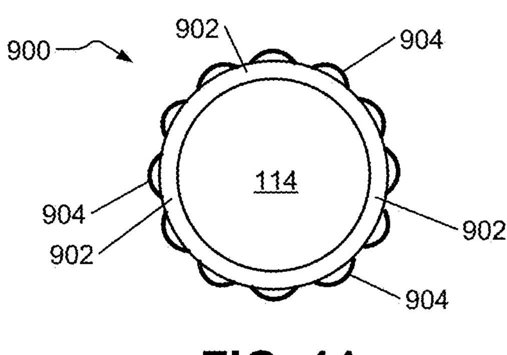
FIG. 11 is a side view of a roller and the sleeve of FIG. 9, according to the present disclosure.

In various embodiments, the sleeves herein may be formed with integrated passive SE-SMA materials. In such examples, the stiffness of the sleeves may be greater than the stiffness of the sleeve 400 (e.g., including any one of the sleeve portions 500, 502, 504, 600, 700) explained above. This may result in a better ability to control the applied stress at corners and edges of the electrode. For example, FIGS. 9-11 depict a single layer design of a sleeve 900 that may be employed as any one of the sleeves 208, 210 shown in FIGS. 2-3 and wrapped about the roller 114. In the example of FIGS. 9-11, the sleeve 900 includes a support layer 902, a smart material element 904 integrated into the support layer 902, and an optional protective layer 910. In such examples, the protective layer 910 may be disposed over the outer surface of the sleeve 900 such that it is interposed between the smart material element 904 and the electrode to improve the surface finish of the electrode. Additionally, the support layer 902 may be a belt formed of rubber, elastomer, leather, polymer, cork, etc. The smart material element 904 may include a SE-SMA material as explained above and in the form of a wire, strip, net, etc. In some examples, set screws or other suitable fastening devices may be employed to secure opposing ends of the smart material element 904 and the support layer 902 and to the roller.

Figure 12:
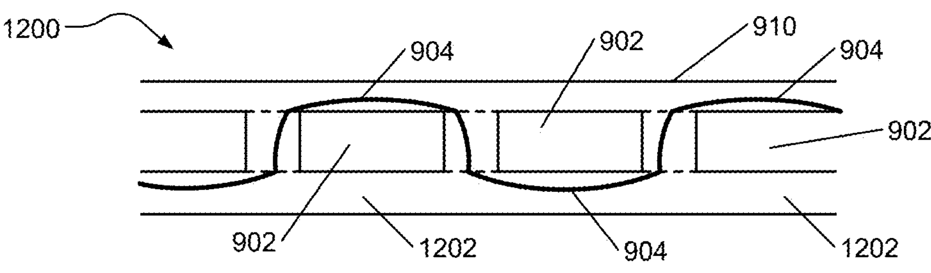
FIG. 12 is a side view of a portion of an example sleeve having a double layer design with an integrated smart material, according to the present disclosure.

In other examples, the sleeves herein may be formed with integrated passive SE-SMA materials in a double layer design. For example, FIG. 12 depicts a double layer design of a sleeve 1200 that may be employed as any one of the sleeves 208, 210 shown in FIGS. 2-3. In the example of FIG. 12, the sleeve 1200 includes the support layer 902, the smart material element 904, and the optional protective layer 910 of FIGS. 9-11. Additionally, the sleeve 1200 includes a support layer 1202 disposed along a bottom surface of the support layer 902 such that a portion of the smart material element 904 of the smart material is positioned between the support layers 902, 904 as shown in FIG. 9. In such examples, the sleeve 1200 may be formed in a manner so that the bottom surface of the support layer 1202 generally contacts the outer surface of the roller (e.g., the roller 114 of FIGS. 1-3). In various embodiments, a coating (e.g., a high friction coating, etc.) may be disposed along the bottom surface of the support layer 1202 (e.g., the surface opposing the support layer 902) and between the support layer 1202 and the outer surface of the roller when the sleeve 1200 is placed on the roller.

Figure 13:
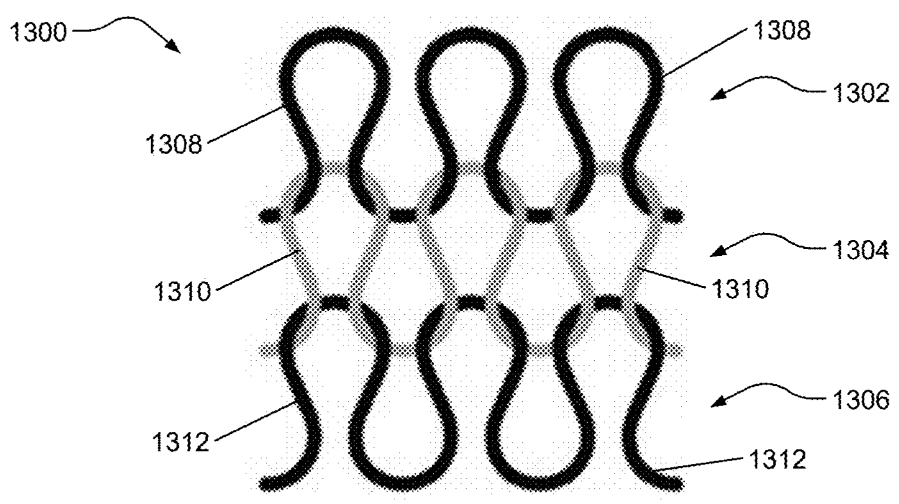
FIG. 13 is a front view of a portion of an example sleeve having knitted bands of material, according to the present disclosure.

In various embodiments, the sleeves herein may be formed of knitted bands of material having radial compliance characteristics. In such examples, each knitted band may be formed of smart and/or non-smart materials. The band or belt of knitted material may be composed of a set of stitches a small field of the constituent stitches. A small field of the constituent stitches for a simple 'jersey' knit is depicted in FIG. 13 as a knit field 1300. The knit field 1300 may be repeated in the circumferential and radial directions to construct any one of the sleeves 208, 210 shown in FIGS. 2-3. In the example of FIG. 13, the knit field 1300 includes three courses 1302, 1304, 1306 of materials 1308, 1310, 1312, respectively, knitted together. While the knit field 1300 of FIG. 13 is shown as including three courses, it should be appreciated that other embodiments may include more or less courses if desired to create a band of the appropriate final geometry.

In such examples, standard knit materials may be constructed of yarn loops interlocking with an adjacent course of yarn above and/or below it. More specifically, and as shown in FIG. 13, the course 1302 has loops formed of the material 1308 that interlock with loops of the adjacent band 1304 formed of the material 1310. Similarly, the course 1304 has loops formed of the material 1310 that interlock with loops of the adjacent course 1306 formed of the material 1312. This configuration produces a uniform layer of material where the yarns overlap at the stitch loops.

The materials 1308, 1310, 1312 may be the same or different types, such as a mixture of smart materials and non-smart materials. For example, the courses 1302, 1304, 1306 may include alternating types of material, the courses 1302, 1304 may have the same material and the course 1306 may have a different material, the courses 1302, 1304, 1306 may have the same material. In the example of FIG. 13, the materials 1308, 1312 are non-smart materials while the material 1310 is a smart material (e.g., a SE-SMA material as explained above), thereby providing an alternating occurrence within the sleeve.

Figure 14:
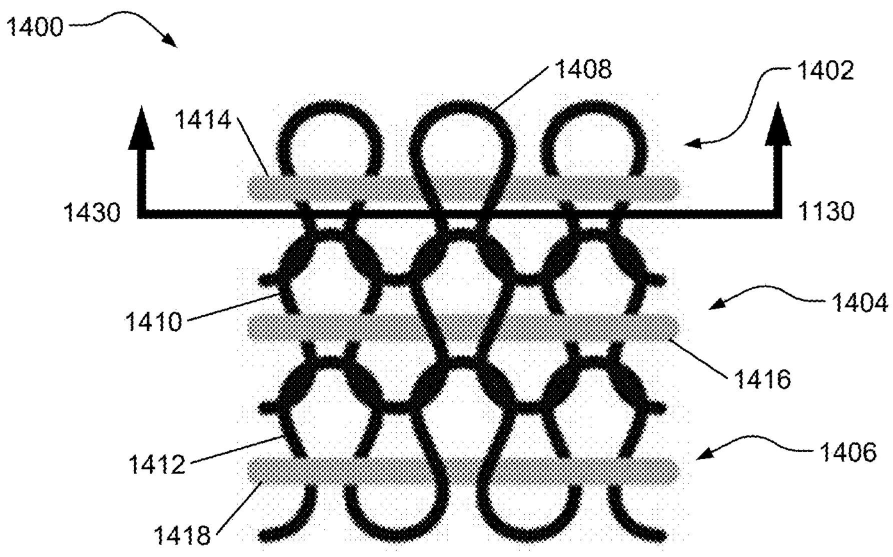
FIG. 14 is a front view of a portion of an example sleeve having knitted bands of material and inlays woven between loops of the knitted bands, according to the present disclosure.

In some examples, other materials may be introduced into the knitted bands of material using additional machine operations, such as inlaying. In such examples, an inlay element may be woven between loops of a knitted band. For example, FIG. 14 depicts a knit field 1400 that may be employed to comprise any one of the sleeves 208, 210 shown in FIGS. 2-3. In the example of FIG. 14, the knit field 1400 includes three courses 1402, 1404, 1406 of materials 1408, 1410, 1412, respectively, knitted together in a similar manner as the courses 1302, 1304, 1306 of FIG. 13 described above. In the example of FIG. 14, the materials 1408, 1410, 1412 are formed of the same type of material, such a non-smart material or a smart material (e.g., are collocated in occurrence within the sleeve). While the knit field 1400 of FIG. 14 is shown as including three courses, it should be appreciated that knit field 1400 in other embodiments may include more or less courses if desired.

As shown in FIG. 14, each knitted course 1402, 1404, 1406 includes inlaid elements 1414, 1416, 1418 woven therein. For example, the knitted course 1402 includes the inlaid element 1414 woven between adjacent loops of the material 1408. In such examples, the inlaid element 1414 passes in front of one loop and then behind the adjacent loop. The knitted courses 1404, 1406 and the inlaid elements 1416, 1418 are similarly configured. While the knitted courses 1402, 1404, 1406 are shown as having the inlaid elements 1414, 1416, 1418 woven between adjacent loops, it should be appreciated that the frequency of the front to back transitions of the inlaid elements 1414, 1416, 1418 with respect to the knitted courses 1402, 1404, 1406 may be different to control the radial compliance characteristics of the knit field 1400.

Figure 15:
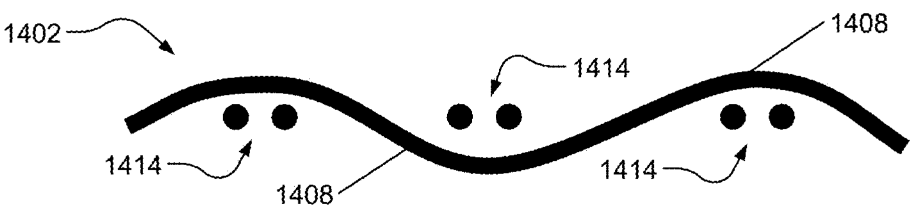
FIG. 15 is a sectional view of one of the knitted bands of FIG. 14, according to the present disclosure.

In various embodiments, when the knitted courses 1402, 1404, 1406 are formed into a tubular structure for wrapping around a roller, the inlaid helix of yarn may develop a wave-spring like structure that will give radial compliance to the knit field 1400. For example, FIG. 15 depicts a sectional view of the knitted course 1402 of FIG. 14 along the line 1430. As shown, the inlaid element 1414 creates a sinusoidal shape (or more generally a wave like shape).

Figure 16:
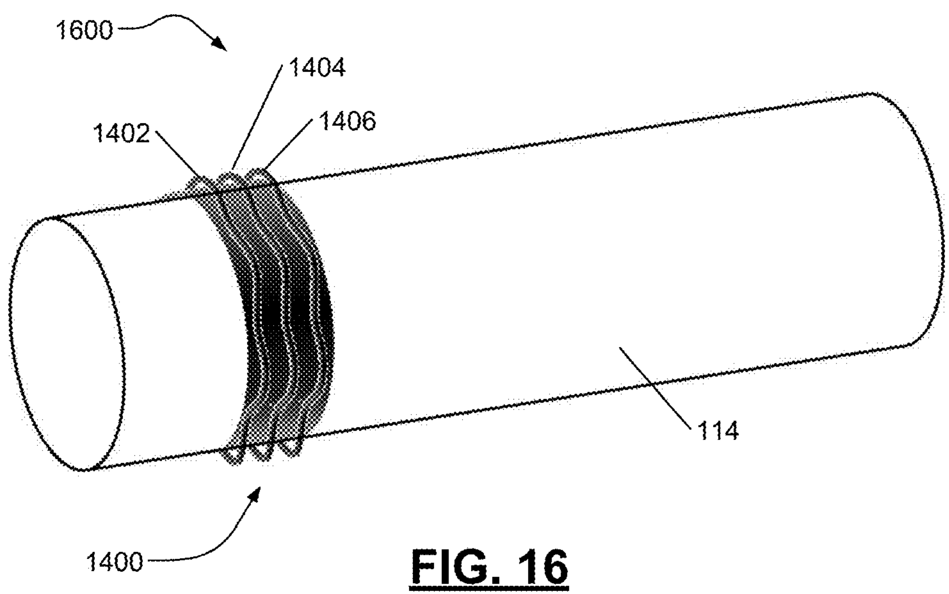
FIG. 16 is an isometric view of a roller and the sleeve of FIG. 14, according to the present disclosure.
Figure 17:
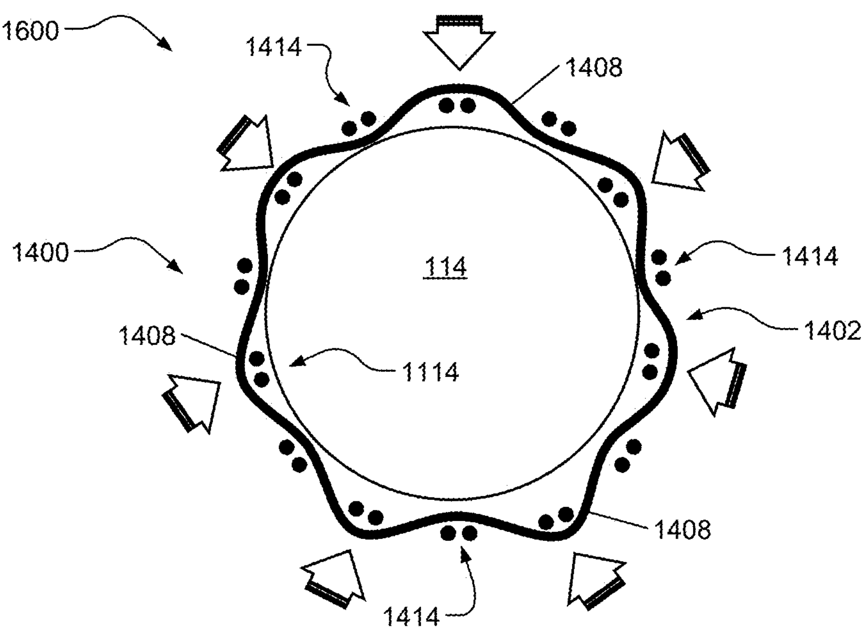
FIG. 17 is a side view of the roller and the sleeve of FIG. 16, according to the present disclosure.

FIGS. 16-17 depict an assembly 1600 including the roller 114 of FIGS. 1-3 and the knit field 1400 of FIGS. 14-15. As described above relative to FIGS. 14-15, the knit field 1400 includes the knitted courses 1402, 1404, 1406 with the inlaid elements 1414, 1416, 1418 woven into the materials 1408, 1410, 1412. As shown in FIGS. 16-17, the knit field 1400 has a sinusoidal shape in a circumferential direction relative to the roller 114. In such examples, if fitted to the proper calendar roll diameter and knit with the appropriate materials, the tubular knit courses 1402, 1404, 1406 may act as a carrier for a helical wave spring structure created by the inlaid elements 1414, 1416, 1418. The carrier knit imparts the bumpy pattern to the inlaid elements 1414, 1416, 1418, creating a compliant surface on the roller 114.

In various embodiments, the knitted courses 1302, 1304, 1306, 1402, 1404, 1406 of FIGS. 13-17 may form a self-folding structure. For example, the knitted courses 1302, 1304, 1306, 1402, 1404, 1406 may be formed of basic jersey knit textiles, which have interconnecting loops joining adjacent courses of the fabric as explained above. The overlapping of the stitch loops may be consistent across a simple textile, but the stitches can loop behind (face) or in front (back) of the loops in the next course. In some embodiments, the jersey knit fabric has a tendency to curl due to this stich architecture, but the direction of that curl is determined by how the loops overlap. For example, stitches that loop behind (face) may curl in one direction and stitches that loop in front (back) may curl in the opposite direction. As such, the knitted courses 1302, 1304, 1306, 1402, 1404, 1406 can be designed to create bowed surfaces that have dramatically increased compliance when placed on a cylindrical surface, such as the roller 114. Further, the stitch length, spacing, and tightness can make this curling effect more or less pronounced; with denser, tighter knits typically curling more. Increasing the stiffness of the material also amplifies the curling, creating a "turn" in a textile with only a few courses of knit.

In other examples, the sleeves herein may be actively controlled with sensing and feedback signals. For example, actively controlled sleeves may be employed if passively designed sleeves are not sufficient. In various embodiments, the sleeves may be formed of smart materials, such as a SE-SMA material as explained above. In such examples, the plateau stress of the SE-SMA material can be controlled by adjusting a temperature of the smart material. For example, the plateau in a stress-strain response may rise by roughly 10.5 MPa for every degree rise in temperature of the smart material for nearly equ-atomic SMAs. Additionally, the same may apply in reverse. For example, the plateau stress or the transformation stress may decrease by 10.5 Mpa for every degree drop in temperature for the material. Limits may exist on how high or low of a temperature can be imposed on the material without compromising its performance. For example, a maximum or upper bound on temperature may be lower than the recrystallization temperature for the SE-SMA material. The lower bound on temperature is usually less critical. This temperature dependence can be used to actively modulate the gripping pressure on an electrode (e.g., the electrode 102) by using directed, non-contact, heating/cooling sources to control the local temperature of the smart material in the region where the electrode tabs are gripped by the sleeves.

Figure 18:
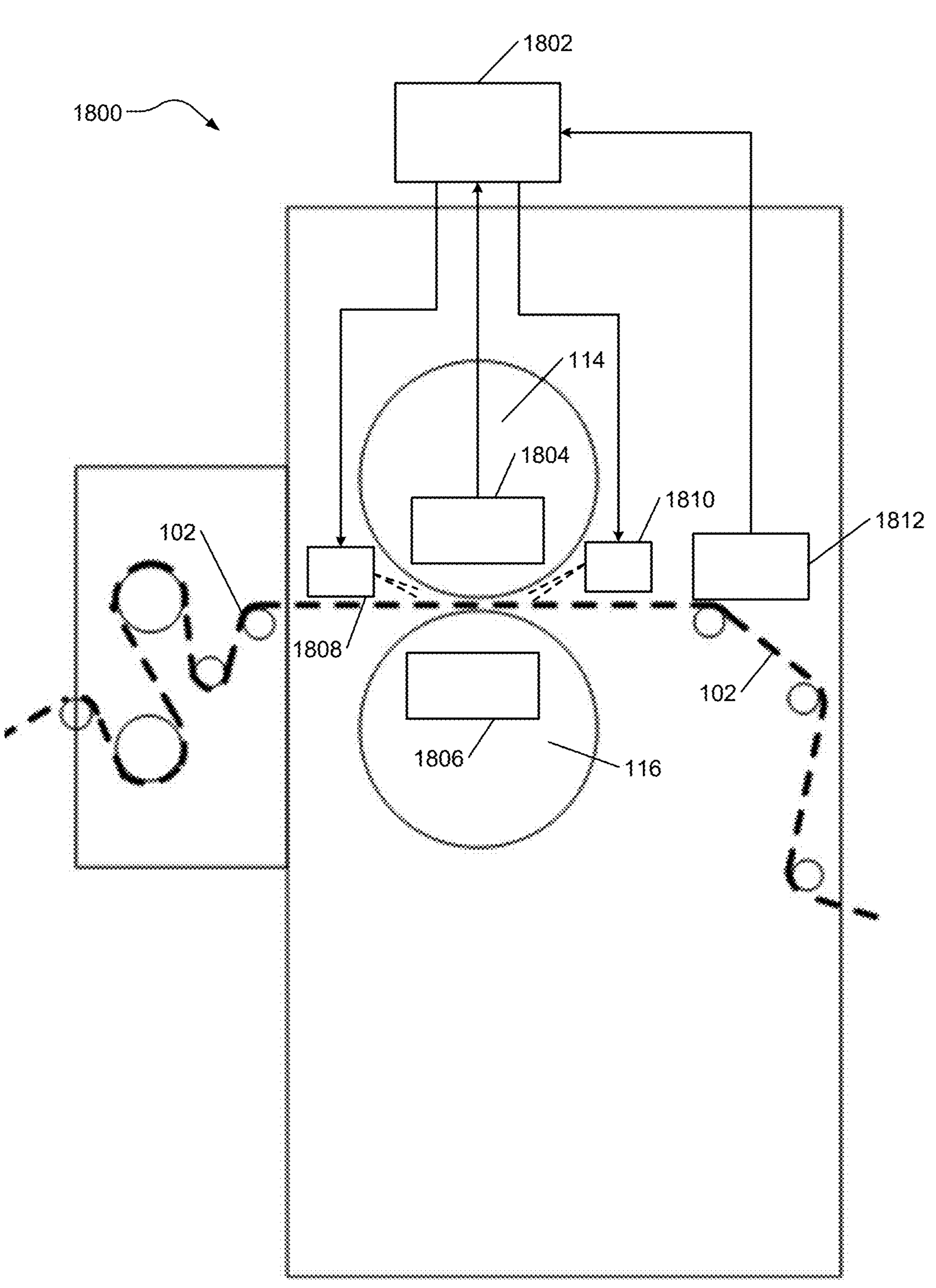
FIG. 18 is a diagram of an electrode calendering system for reducing post-calendering electrode wrinkling, according to the present disclosure.

For example, FIG. 18 depicts an example electrode calendering system 1800 for reducing post-calendering electrode wrinkling. The electrode calendering system 1800 of FIG. 18 is substantially similar to the electrode calendering system 100 of FIG. 1 but includes control components for actively controlling sleeves. For example, the system 1800 includes the multiple rollers (of which only the rollers 114, 116 are labeled for clarity) and the electrode 102 of FIG. 1. Additionally, the system 1800 includes a control module 1802, sensors 1804, 1806, temperature control devices 1808, 1810, and an optional optical sensor 1812. In various embodiments, each sensor 1804, 1806 may include a pressure sensor, a force sensor and/or any other suitable sensor. As shown, the sensors 1804, 1806, the temperature control devices 1808, 1810, and the optical sensor 1812 are in communication with the control module 1802.

In the example of FIG. 18, the sensors 1804, 1806 are generally disposed between sleeves and rollers to measure (e.g., in real-time) the contact pressure distribution to feedback to the control module 1802. For example, the rollers 114, 116 may include one or more sleeves (e.g., any one of the sleeves described herein), which are not shown for clarity. In such examples, the sensor 1804 is disposed between a sleeve wrapped around the roller 114 and the roller 114, and the sensor 1806 is disposed between a sleeve wrapped around the roller 116 and the roller 116. In some examples, the sensors 1804, 1806 may include a sensor array.

In various embodiments, the temperature control devices 1808, 1810 are adjacent to the sleeves wrapped around the rollers 114, 116. In such examples, one or both temperature control devices 1808, 1810 may be controlled (e.g., individually or collectively) to heat or cool one or more of the sleeves. In some examples, the temperature control devices 1808, 1810 may be heating/cooling sources (e.g., HVAC modules) having one or more fans, heaters, air conditioners, infrared (IR) lights, etc. for heating or cooling the sleeves without contacting the sleeves.

In FIG. 18, the optical sensor 1812 is generally disposed downstream of the rollers 114, 116. In such examples, the optical sensor 1812 may include one or more cameras or other suitable devices for capturing images of the electrode 102 downstream of the rollers 114, 116. In such manner, the optical sensor 1812 may capture imaginary of the post-calendering electrode 102.

In various embodiments, the control module 1802 receives one or more signals from one or both of the sensors 1804, 1806. In such examples, the signals may be indicative of a force or pressure value between the corresponding sleeve and roller. Then, based on the received signals, the control module 1802 may control one or both temperature control devices 1808, 1810 to adjust a temperature of the sleeve, thereby adjusting the pressure between the electrode 102 and the sleeve.

In some examples, the control module 1802 may receive one or more signals from the optical sensor 1812. In such examples, the signals provide data to indicate whether the post-calendering electrode 102 has wrinkles or not. In such examples, the control module 1802 may control one or both temperature control devices 1808, 1810 based on the signals from the optical sensor 1812 to adjust a temperature of the sleeve, thereby adjusting the pressure between the electrode 102 and the sleeve. For instance, the control module 1802 may adjust control of the temperature control devices 1808, 1810 based on the data from the optical sensor 1812 and the sensors 1804, 1806. In some examples, the control module 1802 may initiate control based on the signal feedback in response to data from the optical sensor 1812 indicating wrinkling of the electrode 102.

Figure 19:
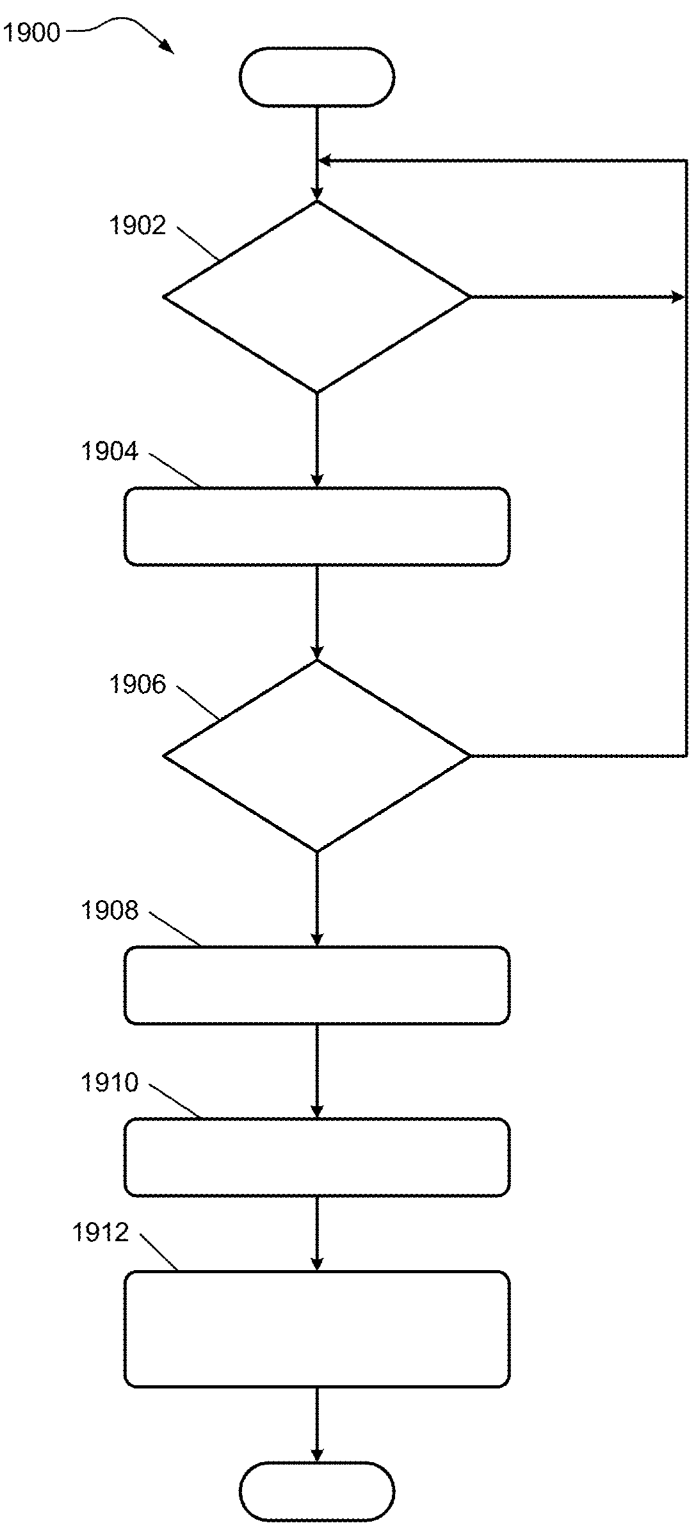
FIG. 19 is a flowchart of an example process for reducing post-calendering electrode wrinkling, according to the present disclosure.

FIG. 19 illustrates an example process 1900 for reducing post-calendering electrode wrinkling. While FIG. 19 is shown and described as including specific steps, it should be appreciated that the process 1900 is an example variation that may be implemented and in other embodiments the process 1600 and/or other example processes may include different steps, more or less steps, etc. Additionally, although the process 1900 is described in relation to the system 1800 of FIG. 18, the process 1900 may be employable by any suitable system.

As shown, the process 1900 begins at 1902 where control determines whether an electrode calendering process has been activated. For example, control may sense (e.g., with a motion sensor, etc.) whether an electrode (e.g., the electrode 102) is received by machinery including rollers. In other examples, a user may select an input once the electrode is received. If no at 1902, control returns to 1902. Otherwise, if yes at 1902, control proceeds to 1904.

At 1904, the control module 1802 receives data from one or more post calendering sensors. For example, the control module 1802 may receive signals from the optical sensor 1812 indicating whether the electrode has wrinkles or not after passing through one or more rollers. Control then proceeds to 1906, where the control module 1802 determines whether the electrode has defects (e.g., wrinkles along edges of the electrodes) as explained herein. If the control module 1802 determines that defects are present, control proceeds to 1908. Otherwise, if the control module 1802 determines that defects are not present, control may return to 1902 as shown or may end.

At 1908, the control module 1802 receives one or more force or pressure values. For example, and as explained above, the control module 1802 may receive one or more force or pressure signals from one or both of the sensors 1804, 1806 located between roller sleeve(s) and the rollers. In such examples, the force or pressure signals may be indicative of a contact pressure distribution. Control then proceeds to 1910.

At 1910, the control module 1802 determines a temperature adjustment for the sleeve(s) based on the force or pressure value(s). For example, and as explained above, the plateau stress of the smart material in the sleeve(s) is controllable by adjusting the temperature of the material. For example, to increase the plateau stress (e.g., the applied force) of the smart material in the sleeve(s), the temperature of the material may be increased. Conversely, to decrease the plateau stress of the smart material in the sleeve(s), the temperature of the material may be decreased. In such examples, the temperature adjustment (e.g., increase or decrease of the temperature) may be determined based on the received force or pressure values. Control then proceeds to 1912.

At 1912, the control module 1802 generates and transmits one or more control signals to one or more temperature control devices. For example, the control module 1802 may generate and transmit the control signals to the temperature control devices 1808, 1810 of FIG. 18 based on the determined temperature adjustment. In such examples, the control module 1802 may transmit a control signal to initiate cooling or heating of the sleeve(s) with the temperature control devices 1808, 1810. In doing so, the thickness of the sleeve(s) may be controlled to adjust a pressure between the electrode and the sleeve(s), as explained herein. Control then may end as shown in FIG. 19 or return to another suitable step, such as step 1908 if desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electrode calendering system for reducing post-calendering electrode wrinkling, the electrode calendering system comprising:

at least one roller configured to compress an electrode, the roller defined by an outer surface configured to contact the electrode, the outer surface having a first edge portion at a first side of the roller, a second edge portion at a second side of the roller opposing the first side, and a middle portion disposed between the first edge portion and the second edge portion, the first edge portion and the second edge portion of the roller aligning with first and second outer edges of the electrode when the electrode contacts the roller, the middle portion configured to contact an interior region of the electrode between the first and second outer edges; and a sleeve disposed about the outer surface of the roller only along the first edge portion, the sleeve having an outer surface configured to contact the first outer edge of the electrode, the sleeve having a controllable thickness extending from the outer surface of the roller to adjust a pressure between the first outer edge of the electrode and the sleeve when the outer surface of the sleeve contacts the first outer edge of the electrode and the middle portion of the outer surface of the roller contacts the interior region of the electrode, wherein the sleeve includes a plurality of knitted courses each having loops interlocking with loops of an adjacent knitted course of the plurality of knitted courses, and wherein the outer surface of the sleeve has a larger diameter than the middle portion of the outer surface of the roller.

2. The electrode calendering system of claim 1, wherein:

the sleeve is a first sleeve;

the electrode calendering system further comprises a second sleeve disposed on the outer surface of the roller along the second edge portion; and the second sleeve has a controllable thickness to adjust a pressure between the second outer edge of the electrode and the second sleeve.

3. The electrode calendering system of claim 1, wherein the thickness of the sleeve adjusts passively to modulate the pressure between the first outer edge of the electrode and the sleeve.

4. The electrode calendering system of claim 1, wherein one or more of the knitted courses includes an inlay element woven therein.

5. The electrode calendering system of claim 1, wherein the sleeve includes multiple inlaid elements having a sinusoidal shape in a circumferential direction relative to the roller.

6. The electrode calendering system of claim 1, wherein:

the plurality of knitted courses includes a first set of courses formed of a smart material and a second set of courses formed of non-smart materials; and the first set of courses and the second set of courses are collocated or alternated in occurrence within the sleeve.

7. The electrode calendering system of claim 1, wherein the sleeve includes a smart material.

8. The electrode calendering system of claim 7, wherein the smart material includes an elastic shape memory alloy.

9. The electrode calendering system of claim 7, wherein the sleeve includes a support layer and the smart material element integrated into the support layer.

10. The electrode calendering system of claim 9, wherein:

the support layer is a first support layer; and the sleeve includes a second support layer disposed along a surface of the first support layer such that a portion of the layer of the smart material is positioned between the first support layer and the second support layer.

11. The electrode calendering system of claim 1, wherein-further comprising:

at least one optical sensor disposed downstream of the roller;

a temperature control device adjacent to the sleeve; and a control module in communication with the optical sensor, the control module configured to receive a signal from the optical sensor and control the temperature control device based on the signal from the optical sensor to adjust a temperature of the sleeve, thereby adjusting the pressure between the first outer edge of the electrode and the sleeve.

12. The electrode calendering system of claim 1, wherein the thickness of the sleeve is actively controlled to adjust the pressure between the first outer edge of the electrode and the sleeve.

13. The electrode calendering system of claim 1, further comprising:

a force or pressure sensor disposed between the sleeve and the roller;

a temperature control device adjacent to the sleeve; and a control module in communication with the force or pressure sensor and the temperature control device, the control module configured to receive a signal from the force or pressure sensor and control the temperature control device based on the signal to adjust a temperature of the sleeve, thereby adjusting the pressure between the first outer edge of the electrode and the sleeve.

14. An electrode calendering method for reducing post-calendering electrode wrinkling, the electrode calendering method comprising:

receiving an electrode at a roller, the roller defined by an outer surface configured to contact the electrode, the outer surface having a first edge portion at a first side of the roller, a second edge portion at a second side of the roller opposing the first side, and a middle portion disposed between the first edge portion and the second edge portion, the first edge portion and the second edge portion of the roller aligning with first and second outer edges of the electrode when the electrode contacts the roller, the middle portion contacting an interior region of the electrode between the first and second outer edges; and controlling a thickness of a sleeve disposed about the outer surface of the roller only along the first edge portion, to adjust a pressure between the first outer edge of the electrode and the sleeve when an outer surface of the sleeve contacts the first outer edge of the electrode and the middle portion of the outer surface of the roller contacts the interior region of the electrode, the thickness of the sleeve extending from the outer surface of the roller, wherein the sleeve includes a plurality of knitted courses each having loops interlocking with loops of an adjacent knitted course of the plurality of knitted courses, and wherein the outer surface of the sleeve has a larger diameter than the middle portion of the outer surface of the roller.

15. The electrode calendering method of claim 14, wherein controlling the thickness of the sleeve includes passively adjusting the thickness of the sleeve to modulate the pressure between the first outer edge of the electrode and the sleeve.

16. The electrode calendering method of claim 14, wherein controlling the thickness of the sleeve includes actively controlling thickness of the sleeve to adjust the pressure between the first outer edge of the electrode and the sleeve.

17. The electrode calendering method of claim 14, wherein:

one or more of the knitted courses includes an inlay woven therein.

18. The electrode calendering method of claim 14, wherein the sleeve includes a smart material.

19. The electrode calendering method of claim 18, further comprising:

receiving a signal from a force or pressure sensor disposed between the sleeve and the roller; and controlling a temperature control device based on the signal to adjust a temperature of the sleeve.

20. The electrode calendering method of claim 18, wherein the smart material includes an elastic shape memory alloy.

* * * * *